US012620644B2

(12) United States Patent
Golubkov

(10) Patent No.: US 12,620,644 B2
(45) Date of Patent: May 5, 2026

(54) METHOD OF DETECTING AN OPERATING CONDITION OF A BATTERY SYSTEM, WHICH MAY LEAD TO A THERMAL RUNAWAY

(71) Applicant: SAMSUNG SDI CO., LTD., Yongin-si (KR)

(72) Inventor: Andrej Golubkov, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 741 days.

(21) Appl. No.: 17/901,758

(22) Filed: Sep. 1, 2022

(65) Prior Publication Data

US 2023/0077121 A1 Mar. 9, 2023

(30) Foreign Application Priority Data

Sep. 2, 2021 (EP) ..................................... 21194567
Aug. 31, 2022 (KR) ......................... 10-2022-0110035

(51) Int. Cl.
*H01M 10/63* (2014.01)
*B60L 3/00* (2019.01)
(Continued)

(52) U.S. Cl.
CPC ........... *H01M 10/63* (2015.04); *B60L 3/0046* (2013.01); *H01M 10/613* (2015.04);
(Continued)

(58) Field of Classification Search
CPC .. H01M 10/63; H01M 10/613; H01M 10/625; H01M 10/6568; H01M 2220/20;
(Continued)

(56) References Cited

U.S. PATENT DOCUMENTS

| | | |
|---|---|---|
| 2015/0171485 A1 | 6/2015 | Rawlinson |
| 2015/0171486 A1 | 6/2015 | Rawlinson |

(Continued)

FOREIGN PATENT DOCUMENTS

| | | |
|---|---|---|
| CN | 102833987 A | 12/2012 |
| CN | 103779629 A | 5/2014 |

(Continued)

OTHER PUBLICATIONS

"Pressure Decay NPL" https://www.cincinnati-test.com/pressure-decay-test/dp-dpdt (Year: 2021).*

(Continued)

*Primary Examiner* — Lisa S Park
(74) *Attorney, Agent, or Firm* — Womble Bond Dickinson (US) LLP

(57) ABSTRACT

A battery system includes a battery pack including battery cells and a cooling system including a coolant transfer member for circulating a liquid coolant in a cooling circuit, a first heat exchanger integrated into the cooling circuit and thermally contacting the battery cells, and a pressure sensor for detecting a change in pressure inside the cooling circuit. A battery management system is connected to the pressure sensor and the coolant transfer member and is for performing a detection mode including: detecting an initial pressure with the pressure sensor and switching off the coolant transfer member for a time period; after switching off the coolant transfer member, capturing the pressure with the pressure sensor; and determining a pressure difference between the initial pressure value and the captured pressure, when the pressure difference exceeds a threshold, determining an abnormal condition that could cause a thermal runaway of the battery pack.

4 Claims, 3 Drawing Sheets

(51) Int. Cl.
H01M 10/613 (2014.01)
H01M 10/625 (2014.01)
H01M 10/6568 (2014.01)

(52) U.S. Cl.
CPC ..... H01M 10/625 (2015.04); H01M 10/6568 (2015.04); H01M 2220/20 (2013.01)

(58) Field of Classification Search
CPC .. H01M 10/48; H01M 10/482; H01M 10/486; H01M 10/633; H01M 10/6556; H01M 10/6567; H01M 10/663; B60L 3/0046; B60L 2240/54; B60L 2240/545; B60L 2240/80; Y02E 60/10
See application file for complete search history.

(56) References Cited

U.S. PATENT DOCUMENTS

| | | | |
|---|---|---|---|
| 2015/0191101 A1 | 7/2015 | Rawlinson | |
| 2015/0333379 A1* | 11/2015 | Janarthanam | ......... H01M 10/48 |
| | | | 429/61 |
| 2022/0013823 A1 | 1/2022 | Schumacher et al. | |

FOREIGN PATENT DOCUMENTS

| | | | |
|---|---|---|---|
| CN | 105083043 A | | 11/2015 |
| CN | 113274669 A | | 8/2021 |
| DE | 10 2008 002 439 A1 | | 12/2009 |
| EP | 2 887 446 B1 | | 1/2017 |
| EP | 3 654 442 A1 | | 5/2020 |
| JP | 2021-86647 A | | 6/2021 |
| JP | 2021086647 | * | 6/2021 |
| KR | 10-2031645 B1 | | 10/2019 |

OTHER PUBLICATIONS

European Search Report issued in corresponding application No. EP 21194567.0 dated Feb. 14, 2022, 7 pages.
Cabrera-Castillo, E. et al., "Calculation of the State of Safety (SOS) for Lithium Ion Batteries," Journal of Power Sources, vol. 324, 2016, pp. 509-520.
Chinese Office Action issued in corresponding CN Application No. 202211065334.8, dated Jul. 23, 2025, 7 pages.

* cited by examiner

METHOD OF DETECTING AN OPERATING CONDITION OF A BATTERY SYSTEM, WHICH MAY LEAD TO A THERMAL RUNAWAY

CROSS-REFERENCE TO RELATED APPLICATION

This application claims priority to and the benefit of European Patent Application No. 21194567.0, filed in the European Patent Office on Sep. 2, 2021, and Korean Patent Application No. 10-2022-0110035, filed in the Korean Intellectual Property Office on Aug. 31, 2022, the entire content of both of which are incorporated herein by reference.

BACKGROUND

1. Field

Aspects of embodiments of the present disclosure relate to a method of detecting an abnormal operating condition of a battery system, which may lead to a thermal runaway.

2. Description of the Related Art

Recently, vehicles for transportation of goods and peoples have been developed that use electric power as a source for motion. Such an electric vehicle is an automobile that is propelled by an electric motor using energy stored in rechargeable batteries. An electric vehicle may be solely powered by batteries or may be a hybrid vehicle powered by, for example, a gasoline generator or a hydrogen fuel power cell. The vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric and hybrid vehicles and the like.

Generally, rechargeable batteries include an electrode assembly including a positive electrode, a negative electrode, and a separator interposed between the positive and negative electrodes, a case receiving (or accommodating) the electrode assembly, and electrode terminals electrically connected to the electrodes of the electrode assembly. An electrolyte solution is injected into the case to enable charging and discharging. The shape of the case, such as cylindrical or rectangular, may be selected based on the battery's intended purpose. Lithium-ion (and similar lithium polymer) batteries, widely known via their use in laptops and consumer electronics, dominate the most recent electric vehicles in development.

Rechargeable batteries may be used as a battery module formed of a plurality of unit battery cells coupled together in series and/or in parallel to provide high energy content, such as for electric motor propulsion of vehicles. The battery module is formed by interconnecting the electrode terminals of the plurality of unit battery cells together in an arrangement based on a desired amount of power and to realize a high-power rechargeable battery.

Battery modules can be constructed either in a block design or a modular design. In the block design, each battery is coupled to a common current collector structure an arranged in a housing. In the modular design, pluralities of battery cells are connected together to form submodules, and several submodules are connected together to form the battery module. In automotive applications, battery systems often consist of a plurality of battery modules connected together in series to provide a desired voltage. The battery modules may include submodules with a plurality of stacked battery cells, and each battery cell stack includes cells connected in parallel that are, in turn, connected in series (XpYs) or cells connected in series that are, in turn, connected in parallel (XsYp).

A battery pack is a set of any number of (usually identical) battery modules. The battery modules may be configured in (or connected in) series, parallel, or a mixture of both to deliver the desired voltage, capacity, and/or power density. Components of the battery packs include the individual battery modules and interconnects, which provide electrical conductivity between the battery modules.

A battery system further includes a battery management system (BMS), which is an electronic system that manages the rechargeable battery cells, battery modules, and battery pack such as by protecting the battery cells from operating outside their safe operating area (or safe operating parameters), monitoring their states, calculating secondary data, reporting that data, controlling its environment, authenticating it, and/or balancing it. For example, the BMS may monitor the state of the battery pack, battery modules, or battery cells as represented by voltage (such as total voltage of the battery pack or battery modules or voltages of individual cells), temperature (such as average temperature of the battery pack or battery modules, coolant intake temperature, coolant output temperature, or temperatures of individual cells), coolant flow (such as flow rate or cooling liquid pressure), and current. Additionally, a BMS may calculate values based on the above items, such as minimum and maximum cell voltage, state of charge (SoC) or depth of discharge (DoD) to indicate the charge level of the battery, state of health (SoH; a variously-defined measurement of the remaining capacity of the battery as % of the original capacity), state of power (SoP; the amount of power available for a defined time interval given the current power usage, temperature and other conditions), state of safety (SoS), maximum charge current as a charge current limit (CCL), maximum discharge current as a discharge current limit (DCL), and internal impedance of a cell (to determine open circuit voltage).

The BMS may be centralized such that a single controller is connected to the battery cells through a multitude of wires. Otherwise, the BMS may be distributed, in which a BMS board is installed at each cell, with just a single communication cable between the battery and a controller. Or the BMS may have a modular construction including a few controllers, each handling a certain number of cells, with communication between the controllers. Centralized BMSs are most economical but are least expandable and are plagued by a multitude of wires. Distributed BMSs are the most expensive but are simplest to install and offer the cleanest assembly. Modular BMSs offer a compromise of the features and problems of the other two topologies.

A BMS may protect the battery pack from operating outside its safe operating area. Operation outside the safe operating area may be indicated be an over-current, over-voltage (e.g., during charging), over-temperature, under-temperature, over-pressure, and ground fault or leakage current detection. The BMS may prevent operation outside the battery's safe operating area by including an internal switch (such as a relay or solid-state device) that opens if the battery is operated outside its safe operating area, requesting the devices to which the battery is connected to reduce or even terminate using the battery, and actively controlling the environment, such as through heaters, fans, air conditioning, or liquid cooling.

The performance of lithium-ion batteries is highly dependent on the proper maintenance of cell temperature. Therefore, effective thermal management is critical to achieve maximum performance when operating under various environmental conditions. Generally, the thermal management focuses on cooling or heating the battery cells, thermally insulating of battery cells, battery modules, and battery pack, as well as ensuring effective heat emission, dissipation, and distribution in the battery pack. The thermal management may be controlled by the BMS and, when properly performed, may ensure safety, and maximize life expectancy, available power, and battery capacity.

Initial heating may also be caused by a local failure, such as a cell internal short circuit, heating from a defective electrical contact, short circuit to a neighboring cell, etc. When a battery cell is heated above a critical temperature (typically above about 150° C.) it can transit (or transition) into a thermal runaway. Thermal runaway occurs in situations where an increase in temperature in a battery cell changes the conditions therein in a way that causes a further increase in temperature, often leading to a destructive result. In rechargeable battery systems, thermal runaway is associated with strongly exothermic reactions that are accelerated by temperature rise. During the thermal runaway, a failed battery cell, for example, a battery cell that has a local failure, may reach a temperature exceeding about 700° C. The battery pack will sustain high damage and the vehicle passenger may be endangered.

It is beneficial to detect, for example, over-temperature of a failed battery cell as early as possible. However, equipping each battery cell with its own temperature sensor is expensive in manufacturing, complicates maintenance, and requires sufficient installation space.

SUMMARY

The present disclosure is defined by the appended claims and their equivalents.

According to an embodiment of the present disclosure, a method of detecting an abnormal operating condition of a battery system, which may lead to a thermal runaway, is provided. The battery system, which performs the detection method, includes: a battery pack including a plurality of battery cells; a cooling system including a coolant transfer member for circulating a liquid coolant in a cooling circuit, a first heat exchange member (e.g., a first heat exchanger) integrated into the cooling circuit and thermally contacting the battery cells, and a pressure sensor configured to detect a change in pressure inside the cooling circuit; and a battery management system (BMS) connected to the pressure sensor and the coolant transfer member and configured to perform a detection mode for detecting an abnormal operating condition of the battery system.

The detection mode includes: detecting an initial pressure with the pressure sensor; switching off the coolant transfer member for a time period; capturing (or measuring) a subsequent pressure with the pressure sensor after switching off the coolant transfer member; and determining a pressure difference between the initial pressure and the subsequent pressure and, when the pressure difference exceeds a threshold, determining an abnormal condition that could cause a thermal runaway of the battery pack.

According to another embodiment of the present disclosure, a battery system includes: a battery pack including a plurality of battery cells; a cooling system including a coolant transfer member configured to circulate a liquid coolant in a cooling circuit, a first heat exchanger integrated into the cooling circuit and thermally contacting the battery cells, and a pressure sensor configured to detect a change in pressure inside the cooling circuit; and a battery management system (BMS) connected to the pressure sensor and the coolant transfer member and configured to perform a detection mode for detecting an abnormal operating condition of the battery system.

The implemented detection mode includes: detecting an initial pressure with the pressure sensor; switching off the coolant transfer member for a time period; capturing (measuring) a subsequent pressure with the pressure sensor after switching off the coolant transfer member; and determining a pressure difference between the initial pressure and the subsequent pressure and, when the pressure difference exceeds a threshold, determining an abnormal condition that could cause a thermal runaway of the battery pack.

Another embodiment of the present disclosure provides an electric vehicle including the afore-mentioned battery system.

Further aspects and features of the present disclosure can be learned from the dependent claims or the following description.

BRIEF DESCRIPTION OF THE DRAWINGS

Aspects and features of the present disclosure will become apparent to those of ordinary skill in the art by describing, in detail, embodiments with reference to the attached drawings, in which.

DETAILED DESCRIPTION

Figure 1:
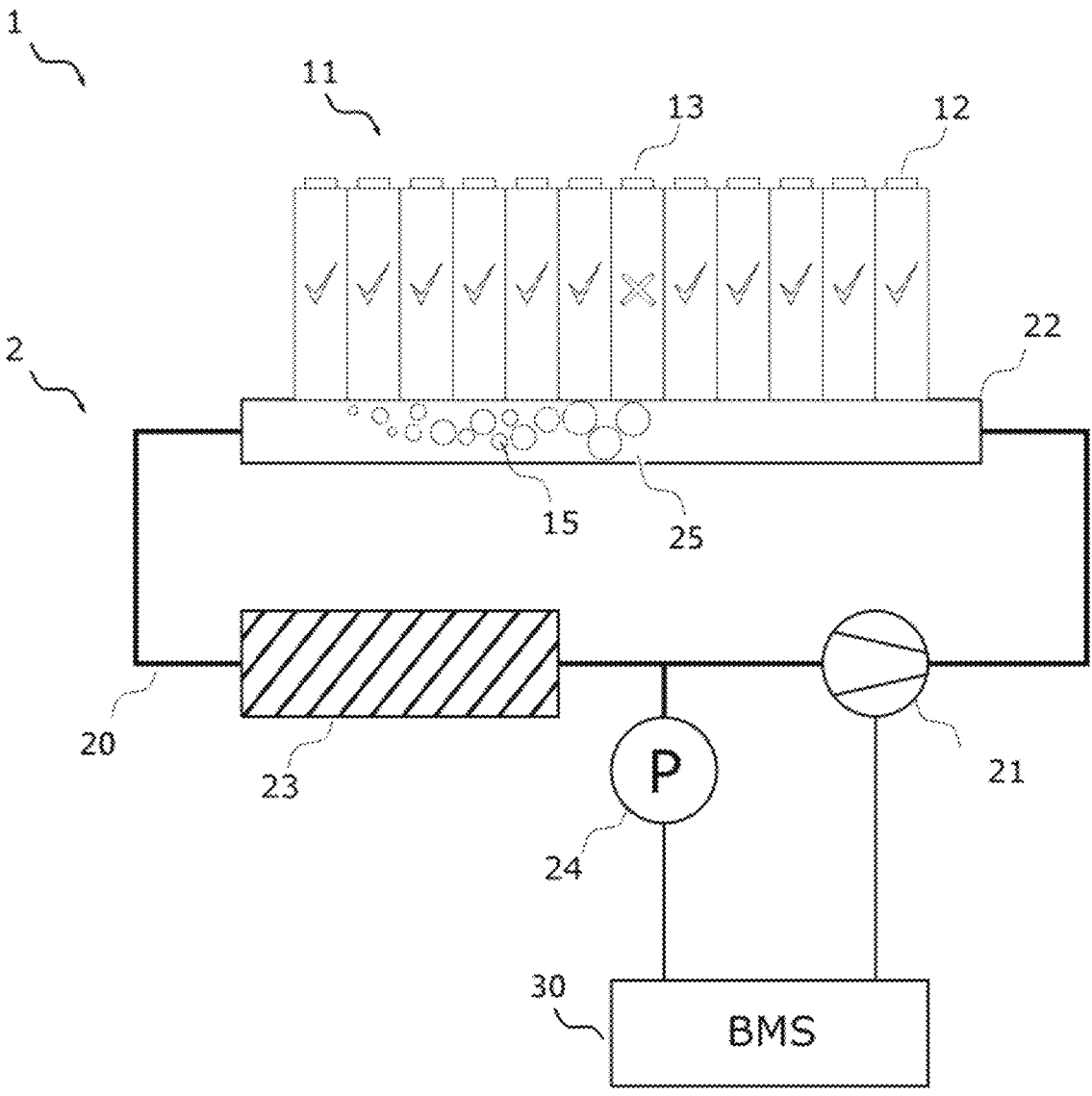
FIG. 1 is a schematic illustration of a battery system according to an embodiment of the present disclosure.

Reference will now be made, in detail, to embodiments, examples of which are illustrated in the accompanying drawings. Aspects and features of the embodiments, and implementation methods thereof, will be described with reference to the accompanying drawings. The present disclosure, however, may be embodied in various different forms and should not be construed as being limited to the embodiments illustrated herein. Rather, these embodiments are provided as examples so that this disclosure will be thorough and complete and will fully convey the aspects and features of the present disclosure to those skilled in the art.

Accordingly, processes, elements, and techniques that are not considered necessary to those having ordinary skill in the art for a complete understanding of the aspects and features of the present disclosure may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present disclosure refers to "one or more embodiments of the present disclosure."

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. Further, the various components of these devices may be implemented on a flexible printed circuit film, a tape carrier package (TCP), a printed circuit board (PCB), or formed on one substrate. The electrical connections or interconnections described herein may be realized by wires or conducting elements, for example, on a PCB or another kind of circuit carrier. The conducting elements may include metallization, such as surface metallizations and/or pins, and/or may include conductive polymers or ceramics. Further electrical energy might be transmitted via wireless connections, for example, by using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory, which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

According to an embodiment of the present disclosure, a method of detecting an abnormal operating condition of a battery system, which may lead to a thermal runaway, is provided. The battery system, which performs the detection method, includes a battery pack including a plurality of battery cells, a cooling system including a coolant transfer member for circulating a liquid coolant in a cooling circuit, a first heat exchange member (e.g., a first heat exchanger) integrated into the cooling circuit and thermally contacting the battery cells, and at least one pressure sensor configured to detect a change in pressure inside the cooling circuit, and a battery management system (BMS) connected to the pressure sensor and the coolant transfer member and being configured to perform a detection mode for detecting an abnormal operating condition of the battery system.

The detection method includes the steps of: a) detecting an initial pressure with the pressure sensor and switching off the coolant transfer member for a time period (e.g., a specified time period), b) after switching off the coolant transfer member, capturing (or measuring) the pressure with the pressure sensor, and c) determining a pressure difference between the initial pressure and the captured (or measured) pressure and, when the pressure difference exceeds a threshold (e.g., a predetermined threshold), detecting an abnormal condition that could cause the occurrence of a thermal runaway of the battery pack.

The battery system can be run under a specific mode for improving the detection of an operating state of the battery system, which may lead to (or be a precursor to) the occurrence of a thermal runway. For example, a pressure sensor is integrated into the cooling circuit and is configured to determine a pressure or pressure change of a liquid coolant at least during the detection mode. The cooling system for circulating the liquid coolant in the cooling circuit includes a coolant transfer member, which may be switched on and off by the BMS. The cooling circuit, or at least a part of the cooling circuit in which the heat exchange member and the pressure sensor are assembled, is a closed system without pressure compensation devices. Further, a first heat exchange member, such as a cooling plate, is integrated into the cooling circuit and thermally contacts the battery cells for cooling. The BMS may initiate measurement of the coolant pressure by the pressure sensor in the detection mode, and the measured values are transmitted from the pressure sensor to the BMS. During the detection mode, the coolant transfer member is switched off and the initial pressure is detected with the pressure sensor (step a)). The coolant transfer member will be switched off for a time period (e.g., a specified time period) and then switched on again. Any change of the pressure during said time period will be detected by the pressure sensor (step b)). If the pressure or pressure increase exceeds a limit (e.g., a reference or specified limit), the BMS evaluates this event as an indication for an abnormal operation condition of at least one battery cell of the battery pack (step c)). In this case, safety routines or countermeasures can be taken to avoid a thermal runaway.

The above-described detection method is based on a finding that the coolant pressure may raise significantly in case of over-temperature of one or more secondary batteries of the battery pack. In normal operation conditions, lithium ion battery cells are designed to work at temperature not exceeding, for example, about 80° C. In case of over-temperature due to failure of a battery cell, the temperature may reach or exceed the boiling temperature of the coolant, which is, for example, water. For example, a hot spot may be formed inside the cooling circuit adjacent to the place where thermal contact with the failed cell is established. At the hot spot, some of the coolant will be evaporated, and the evaporated coolant will form bubbles causing an increase of pressure within the cooling circuit. However, the evaporated coolant may condensate again inside the cooling circuit when the coolant is conveyed further by the coolant transfer member and leaves the hot spot. Thus, the amount of coolant vapor will also depend on the coolant throughput through the hot spot. At a high coolant flow rate, less vapor will exist at any time because the coolant spends less time in the hot spot area and any coolant vapor will condensate faster because it is quickly transported away from the hot spot area. During the detection mode, the coolant transfer member is therefore switched off, causing a larger amount of coolant to evaporate in case of a hot spot, which causes a more significant increase of the detected pressure. In addition, the measured value is not superimposed by the periodic pressure increase due to driving. As a consequence, the detection mode significantly increases the sensitivity for detecting over-temperature of battery cells.

The indirect method for detecting cell over-temperature may be used in combination with other safety routines implemented in the BMS to improve the overall reliability of over-temperature detection, or detection of an abnormal condition, which may lead to a thermal runway. Due to the indirect detection of over-temperature, it may not be necessary to equip each battery cell with its own temperature sensor, and the manufacturing costs of the battery pack can be significantly lowered.

A pressure value may be detected continuously or along with initiating the detection mode. At the beginning of the detection mode, an initial pressure value of the coolant is read by the BMS (step (a)). The initial pressure value can be read directly with initiating the detection mode or with a short delay in time after switching off the coolant transfer member to avoid pressure changes due to a drop in driving pressure.

In step b) of the detection mode, the initial pressure of the coolant is detected by the pressure sensor while the coolant transfer member is switched off for a time period (e.g., a specified time period). The time period depends on the configuration of the battery system and is adjusted (or set) for each specific application. Factors that can influence the duration of the time window may include, for example, the boiling point of the coolant, the cooling performance of the cooling system, sensitivity and localization of the pressure sensor, and safety requirements. Generally, the time period is set at least such that a significant increase of pressure could be expected in case of an over-temperature of a battery cell. The maximum duration must comply with the safety requirements of the battery system, that is, cooling should not be interrupted for such a long time that overheating of battery cells occurs. Usually, the detection mode may be upheld (or conducted or run) for a period between about 10 seconds to about 60 seconds and then the coolant transfer member will be switched on again.

The time period may be preset at the beginning of the detection mode. It can be a period of time (e.g., a predetermined period of time) or the period of time is calculated or specified by taking other operating parameters of the battery system into account when the detection mode is initiated. For example, the period of time may be specified depending (or based) on the actual coolant temperature. At a lower coolant temperature, the period of time could be extended to ensure sufficient coolant evaporation at local hot spots. When the pressure is continuously captured by the BMS, the driving may immediately be resumed when the pressure or increase of pressure exceeds a threshold (e.g., a predetermined threshold), for example, the coolant transfer members are immediately switched on for safety reasons even before the end of the specified time period.

In step c), the pressure difference between the initial pressure value and the captured pressure is determined (or calculated) by the BMS. When the pressure difference exceeds a threshold (e.g., a predetermined or specified threshold), an abnormal condition that could cause the occurrence of a thermal runaway of the battery pack is indicated. The threshold or pressure limit depends on the configuration of the battery system and is adjusted (or set) for each specific application. Factors that can influence the threshold may include, for example, the kind of liquid coolant as well as sensitivity and localization of the pressure sensor. Generally, the threshold is set at least such that any increase in pressure purely due to thermal expansion of the liquid is excluded. In other words, the threshold should reflect a pressure increase due to evaporation of coolant.

As described above, supplemental safety routines for detection of an abnormal condition leading to a thermal runaway may be combined with the detection mode (or detection method) according to embodiments of the present disclosure. Such supplemental safety routines may include (i) BMS subroutines for calculation of the likelihood of occurrence of a thermal runaway and/or (ii) controlling of at least one other parameter of the battery system besides the pressure within the cooling circuit. For example, the following events may also indicate an abnormal condition: exceeding a temperature limit inside the housing, exceeding a coolant temperature, detection of a crash, detection of an abnormal voltage of one or more battery cells, detection of over-current of the battery pack, and detection of an abnormal gas-compositions within the housing.

Suitable parameters and threshold values for determination of abnormal conditions depend on the configuration of the battery system and are determined (or adjusted) for each application. For example, a coolant temperature may be measured by a temperature sensor. If the temperature exceeds, for example, about 70° C., the BMS may initiate the disclosed detection mode. Or a crash sensor may detect a crash of a vehicle containing the battery system with another object. The BMS may initiate the detection mode in response to the detected crash. Also, the BMS may activate the detection mode in response to a detected abnormal voltage of battery cells or over-current of the battery pack may initialize. Further, gas sensors within the housing of the battery pack may detect abnormal gas-composition indicating damage of a battery cell, which also causes the detection mode to start.

Besides controlling one or more of the specified parameters, the BMS may include, in alternative or in addition, an algorithm for determination of a state of safety (SoS). The state of safety may be likelihood levels for a failure of the battery system. Thus, exceeding a given likelihood level may indicate an abnormal condition and, as a consequence, the BMS may initiate countermeasures or safety routines to avoid, or at least mitigate, the harmful effects of a thermal runaway. Thus, measurement of pressure change within the cooling circuit according to the above-described detection mode may provide another suitable parameter for SOS.

According to another embodiment of the present disclosure, a battery system includes a battery pack including a plurality of battery cells. The battery system further includes a cooling system including a coolant transfer member for circulating a liquid coolant in a cooling circuit, a first heat exchange member (e.g., a first heat exchanger) integrated into the cooling circuit and thermally contacting the battery cells, and at least one pressure sensor configured to detect a change in pressure inside the cooling circuit. The battery system also includes a battery management system (BMS) that is connected to the pressure sensor and the coolant transfer member by signal lines. The BMS is configured to perform a detection mode as described above for detecting an abnormal operating condition of the battery system.

In the battery system, the coolant transfer member may be arranged in the cooling circuit upstream from the first heat exchange member, which may be, for example, a cooling plate, and the pressure sensor is arranged in the cooling circuit downstream from the first heat exchange member. Thereby, pressure changes caused solely by a drop in driving pressure, when the coolant transfer member is switched off, may be lowered or mitigated. For example, the pressure sensor may be arranged near the inlet side of the coolant transfer member so that the pressure increase, which is caused by the coolant transfer member and the flow resistance of the components in the cooling circuit, does not intervene (or interfere) with the measurement conditions during the detection mode.

Yet another embodiment of the present disclosure provides an electric vehicle including the afore-described battery system.

FIG. 1 is a schematic illustration of a battery system 1 according to an embodiment of the present disclosure. The battery system 1 may be a component of an electric vehicle and includes a battery pack 11 including a row of secondary battery cells (e.g., lithium secondary battery cells) 12, 13 assembled on a first heat exchange member (e.g., a first heat exchanger) 22. In the row of battery cells, the battery cell 13 is in (or experiencing) an abnormal condition (also indicated by the "X"), which may lead to the occurrence of a thermal runway, whereas the other battery cells 12 remain in a safe operation condition (indicated by the ✓).

The first heat exchange member 22 is part of a cooling system 2, which also includes a coolant transfer member 21 for circulating a liquid coolant, such as water, in a cooling circuit (e.g., coolant circuit) 20. In the present example embodiment, the coolant transfer member 21 may be a pump, but embodiments are not restricted thereto. Hereinafter, for convenience, the coolant transfer member 21 is referred to as a pump.

The coolant flow is driven by the pump 21. Here, the first heat exchange member 22 is a cooling plate (referred to herein as the cooling plate 22) and the bottom sides of the battery cells 12, 13 are in thermal contact with the cooling plate 22. The cooling plate 22 is cooled by the liquid coolant, which flows inside channels 25 through the cooling plate 22. According to the illustrated embodiment, a second heat exchange member (e.g., a second heat exchanger) 23 is provided downflow (or downstream) from the first heat exchange member 22 in the cooling circuit 20 and allows for heat-exchange between the liquid coolant and the ambient environment.

The cooling system 2 further includes a pressure sensor 24 configured to detect a change in pressure inside the cooling circuit 20. The pressure sensor 24 is arranged near an inlet side of the pump 21 so that a pressure increase, which is caused by the pump 21 and a flow resistance of the components in the cooling circuit 20, does not negatively intervene (or impact) the measurement conditions during a detection mode, which will be described in more detail below.

The battery system 1 further includes a battery management system (BMS) 30 that is connected to the pressure sensor 24 and the pump 21 by, for example, signal lines. The BMS 30 is configured to perform a detection mode for detecting an abnormal operating condition of the battery system 1. During the detection mode, bubbles 15 may occur due to evaporation of the liquid coolant, resulting in an increase of pressure, which can be detected by the pressure sensor 24.

The BMS 30 is an electronic system that manages the battery pack 11, such as by protecting the battery cells 12, 13 from operating outside their safe operating area, monitoring their states, calculating secondary data, reporting that data, controlling its environment, authenticating it, and/or balancing it. For example, the BMS 30 may monitor the state of the battery pack 11 as represented by voltage (such as total voltage of the battery pack or battery modules, voltages of individual cells, etc.), temperature (such as average temperature of the battery pack or battery modules, coolant intake temperature, coolant output temperature, or temperatures of individual cells), coolant flow (such as flow rate, cooling liquid pressure, etc.), and current. Additionally, the BMS 30 may calculate values based on the above items, such as minimum and maximum cell voltage, state of charge (SoC) or depth of discharge (DoD) to indicate the charge level of the battery, state of health (SoH; a variously-defined measurement of the remaining capacity of the battery as % of the original capacity), state of power (SoP; the amount of power available for a defined time interval given the current power usage, temperature and other conditions), state of safety (SoS), maximum charge current as a charge current limit (CCL), maximum discharge current as a discharge current limit (DCL), and internal impedance of a cell (to determine open circuit voltage). To simplify the function of the BMS 30, reference is only made to the specific detection mode using the pressure sensor 24, which measures a pressure within the cooling circuit 20 and provides measurement data to the BMS 30. However, other sensed (or monitored) parameters or calculated values may—if combined with the outcome of the present detection mode—also be useful for determination of the occurrence of a thermal runaway.

Figure 2:
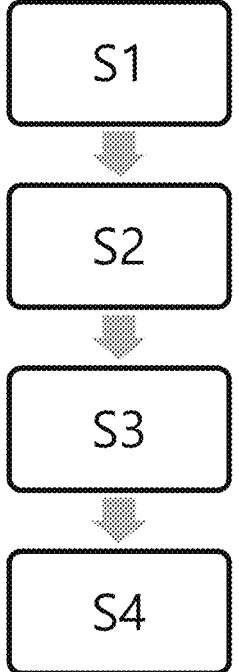
FIG. 2 is a flow chart illustrating a method for detecting an abnormal operating condition, which may lead to a thermal runaway, according to an embodiment of the present disclosure.

FIG. 2 is a flow chart illustrating a process of detecting an abnormal operating condition, which may lead to a thermal runaway, in the battery system illustrated in FIG. 1.

In step S1, the BMS 30 switches into a detection mode. Switching into the detection mode may be caused by a subroutine implemented into the BMS 30. The subroutine may initiate the detection mode based on predefined time periods. Alternatively or additionally, other operation conditions may initiate the detection mode. For example, if the coolant temperature increases to about 70° C., the subroutine may initiate the detection mode.

In step S2, the pump 21 is switching off for a specified time period and an initial pressure is detected by the pressure sensor 24. Sensing the initial pressure may be achieved slightly before switching off the pump 21, at the same time of switching off the pump 21, directly after switching off the pump 21 or at a time of passing a short delay of time, for example, about 5 seconds, after switching off the pump 21.

In step S3, the pressure is continuously captured (or monitored) with the pressure sensor 24 during the period of time the pump 21 is switched off. A pressure difference between the initial pressure value and the captured pressure is determined by the BMS 30. The pressure difference is compared with a threshold and, if the pressure difference exceeds the threshold, an abnormal condition that could cause the occurrence of a thermal runaway of the battery pack 11 is indicated by the BMS 30.

In step S4, the BMS 30 may switch back to ordinary operation conditions when the pressure difference does not exceed the threshold and may, from among other things, switch on the pump 21. However, when the pressure difference exceeds the threshold, the BMS 30 may immediately initiate safety routines or countermeasures to avoid or at least mitigate a thermal runaway of one or more battery cells 12, 13.

Figures 3A, 3B:
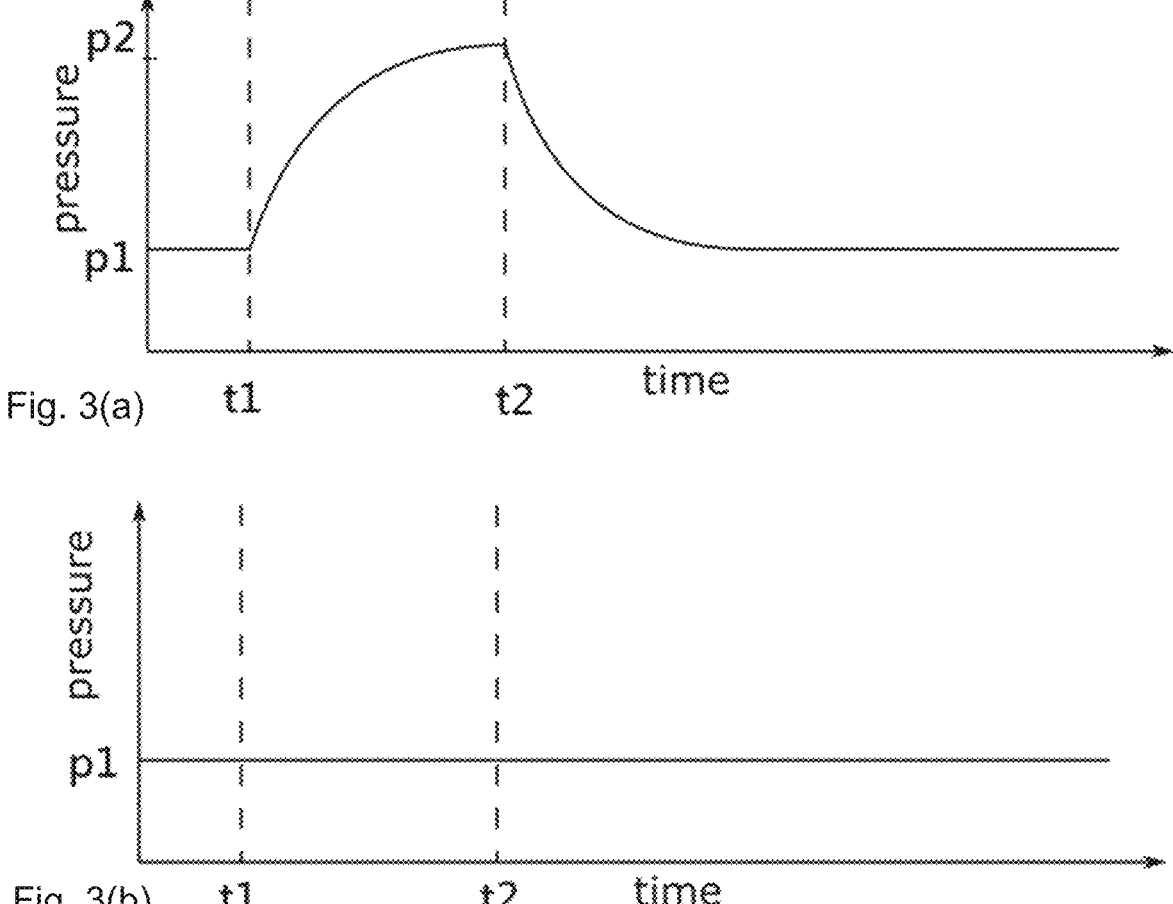
FIG. 3($a$) is a graph illustrating pressure variation during a detection mode for identifying an abnormal condition in a case that one or more battery cells of a battery system show the phenomena of over-temperature, and FIG. 3($b$) is a graph illustrating pressure over time without any over-temperature of the battery cells.

FIG. 3(*a*) schematically illustrates a pressure curve during the detection mode for identifying an abnormal condition when a battery cell of the battery system experiences an over-temperature condition, and FIG. 3(*b*) shows a pressure curve during the detection mode for identifying an abnormal condition when none of the battery cells experience an over-temperature condition. As described above, the battery system 1 as illustrated in FIG. 1 includes a failed battery cell 13, which has a temperature exceeding normal conditions (e.g., the temperature of the battery cell 13 is significantly higher than it should be under usual operation conditions of the battery system 1). As long as the liquid coolant is pumped through the cooling circuit 20, the pressure does not significantly vary (or change) because the failed battery cell

13 is continuously cooled by the flow of coolant and any evaporated coolant may condensate.

However, when the detection mode is initiated by the BMS 30—as a routine measure or due to another parameter detected by the BMS 30 that indicates an abnormal condition—the pump 21 is switched off for a time period between time point t1 and time point t2. As a consequence, a hot spot is formed at the location where the failed battery cell 13 is in thermal contact with the cooling circuit 20. When the temperature of the hot spot exceeds the boiling temperature of the coolant, bubbles 15 will form. The initially detected pressure p1 raises within the cooling circuit 20. At time point t2, the captured (or measured) pressure p2 is significantly higher compared to the initial pressure p1 at time point t1. The pressure decreases when the pump 21 is switched on as long as the failed battery cell 13 does not change into the state of thermal runaway. If the pressure difference between the initial pressure p1 and the captured pressure p2 exceeds a threshold (e.g., a predetermined threshold), the BMS 30 will indicate an abnormal condition. Hence, the detection mode indirectly provides information about an upcoming thermal runaway and safety routines or countermeasures can be taken by the BMS 30 to avoid such a critical situation.

For comparison, FIG. 3(*b*) shows a pressure detected by the pressure sensor 24 when none of the battery cells 12, 13 is in condition of over-temperature. Pressure p2 at time point t2 equals the initial pressure p1 at time point t1.

SOME REFERENCE NUMERALS

1 battery system
2 cooling system
11 battery pack
12 battery cells
13 failed battery cell
15 bubbles
20 cooling circuit
21 coolant transfer member/pump
22 first heat exchange member
23 second heat exchange member
24 pressure sensor
25 channel
30 battery management system (BMS)

What is claimed is:

1. A method of detecting an abnormal operating condition of a battery system the battery system comprising: a battery pack comprising a plurality of battery cells; a cooling system comprising a coolant transfer member configured to circulate a liquid coolant in a cooling circuit, a first heat exchanger integrated into the cooling circuit and thermally contacting the battery cells, and a pressure sensor configured to detect a change in pressure inside the cooling circuit; and a battery management system connected to the pressure sensor and the coolant transfer member, the detection method comprising:

detecting, by the battery management system, an initial pressure with the pressure sensor;

switching off the coolant transfer member for a time period;

detecting a subsequent pressure with the pressure sensor after switching off the coolant transfer member; and determining a pressure difference between the initial pressure and the subsequent pressure and, when the pressure increases and the pressure difference exceeds a threshold, determining an abnormal condition that could cause a thermal runaway of the battery pack.

2. A battery system comprising:

a battery pack comprising a plurality of battery cells;

a cooling system comprising:

a coolant transfer member configured to circulate a liquid coolant in a cooling circuit;

a first heat exchanger integrated into the cooling circuit and thermally contacting the battery cells; and a pressure sensor configured to detect a change in pressure inside the cooling circuit; and a battery management system connected to the pressure sensor and the coolant transfer member, the battery management system being configured to perform a detection mode for detecting an abnormal operating condition of the battery system, the detection mode comprising:

detecting an initial pressure with the pressure sensor;

switching off the coolant transfer member for a time period;

capturing the pressure with the pressure sensor after switching off the coolant transfer member; and determining a pressure difference between the initial pressure and the captured pressure and, when the pressure increases and the pressure difference exceeds a threshold, determining an abnormal condition that could cause a thermal runaway of the battery pack.

3. The battery system according to claim 2, wherein the coolant transfer member is arranged in the cooling circuit upstream from the first heat exchanger, and the pressure sensor is arranged in the cooling circuit downstream from the first heat exchanger.

4. An electric vehicle comprising the battery system according to claim 2.

* * * * *